US012337460B2

(12) United States Patent
Barke

(10) Patent No.: US 12,337,460 B2
(45) Date of Patent: Jun. 24, 2025

(54) WRENCH EXTENSION ASSEMBLY

(71) Applicant: Craig Barke, Roseburg, OR (US)

(72) Inventor: Craig Barke, Roseburg, OR (US)

( * ) Notice: Subject to any disclaimer, the term of this patent is extended or adjusted under 35 U.S.C. 154(b) by 372 days.

(21) Appl. No.: 18/085,956

(22) Filed: Dec. 21, 2022

(65) Prior Publication Data

US 2024/0208032 A1 Jun. 27, 2024

(51) Int. Cl.
*B25G 1/04* (2006.01)

(52) U.S. Cl.
CPC .................................... *B25G 1/043* (2013.01)

(58) Field of Classification Search
CPC .......... B25G 1/005; B25G 1/043; B25G 3/24; B25G 3/28; B25B 13/481
USPC ............... D8/14, 21, 22, 27, 51, 88, 89, 107
See application file for complete search history.

(56) References Cited

U.S. PATENT DOCUMENTS 1,463,077 A * 7/1923 Raleigh .................. B25G 1/043 81/177.2
1,511,738 A * 10/1924 Lownsbery ............ B25G 1/043 81/177.2
1,643,027 A * 9/1927 Merle .................... B25G 1/025 81/177.2
1,689,639 A * 10/1928 Neff ........................ B25B 13/08 81/177.2
1,775,402 A 9/1930 Mandl
4,564,991 A * 1/1986 Taylor ..................... B25B 33/00 269/319
4,644,600 A * 2/1987 Fugate .................... B25B 27/02 81/177.2
4,709,602 A 12/1987 Grabovac
D298,007 S * 10/1988 Williams .......................... D8/17
4,960,014 A * 10/1990 Kelley .................. B25G 1/005 81/177.2
D328,017 S * 7/1992 Boeke ................................ D8/21
5,570,617 A * 11/1996 Love ...................... B25G 1/043 81/177.2
D394,992 S * 6/1998 Landin ............................. D8/21
5,832,794 A * 11/1998 Fowler .................... B25B 13/08 81/177.2
D421,379 S * 3/2000 Sanford .......................... D8/107
6,267,030 B1 * 7/2001 Rodoni .................. B25G 1/043 81/177.2
6,308,596 B1 * 10/2001 Williams ............... B25G 1/043 81/177.1
D476,203 S * 6/2003 Mahan ............................. D8/21

(Continued)

FOREIGN PATENT DOCUMENTS

CN 1017904438 7/2010

*Primary Examiner* — David B. Thomas
(74) *Attorney, Agent, or Firm* — Egge

(57) ABSTRACT

A wrench extension assembly for increasing an effective length of a wrench includes a sleeve that has a slot extending through an outer wall of the sleeve such that a wrench is insertable into the sleeve. The slot accommodates a head of the wrench to increase leverage a user can apply to the wrench. The slot has an entry portion curving into a straightened portion. A channel is integrated into an interior of the sleeve thereby facilitating the channel to insertably receive the head of the wrench. Furthermore, the channel inhibits the head from tipping in the sleeve thereby inhibiting the wrench from tipping in the sleeve when the user is employing the wrench to loosen or tighten a fastener.

9 Claims, 3 Drawing Sheets

(56) References Cited

U.S. PATENT DOCUMENTS

| | | | | | |
|---|---|---|---|---|---|
| 6,626,069 | B1 * | 9/2003 | Cooper | B25G 1/043 | |
| | | | | 81/177.85 | |
| D598,257 | S * | 8/2009 | Darby | D8/27 | |
| D630,481 | S * | 1/2011 | Hutt | D8/27 | |
| 8,931,376 | B2 * | 1/2015 | Humphrey | B25G 1/005 | |
| | | | | 81/177.2 | |
| 9,649,760 | B2 * | 5/2017 | Klimsza | B25G 3/24 | |
| 9,752,348 | B2 * | 9/2017 | Leach | E05B 1/0053 | |
| 9,873,194 | B2 * | 1/2018 | Bolivar | B25G 1/005 | |
| 10,611,014 | B2 * | 4/2020 | Lazarov | B25G 1/043 | |
| 10,723,003 | B2 * | 7/2020 | East | B25B 27/0071 | |
| 11,034,013 | B2 * | 6/2021 | Mulligan | B25G 1/105 | |
| D1,031,394 | S * | 6/2024 | Lopez | D8/27 | |
| 2012/0174718 | A1 | 7/2012 | James | | |
| 2013/0098211 | A1 * | 4/2013 | Sampson, Sr. | B25G 1/005 | |
| | | | | 81/177.2 | |
| 2013/0233134 | A1 * | 9/2013 | Humphrey | B25G 1/005 | |
| | | | | 81/177.2 | |
| 2017/0320208 | A1 * | 11/2017 | Culkin | B25G 1/005 | |

* cited by examiner

WRENCH EXTENSION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to extension devices and more particularly pertains to a new extension device for increasing an effective length of a wrench. The device includes a sleeve which has a slot extending longitudinally along the sleeve for accommodating head of a wrench that is inserted into the sleeve. The sleeve increases the length of the wrench to increase leverage that can be applied by a user. The sleeve includes a channel which accommodates the head of the wrench to inhibit the head of the wrench from tipping when a fastener is being loosened or tightened.

(2) Description of Related Art Including Information Disclosed Under 37 CFR 1.97 and 1.98

The prior art relates to extension devices including a modular socket wrench assembly that includes a ratcheting wrench, a plurality of sockets and a plurality of extensions. The prior art discloses a hand grip that is structured to fit around a socket wrench extension. The prior art discloses a rotary torque wrench device that includes a rotating grip. The prior art discloses a wrench extender that includes a plurality of grips distributed along a member for mounting a handle of a wrench to the member and a knob which extends through a head of the wrench to secure the wrench to the member. The prior art discloses a wrench assembly which includes a first wrench pivotally attached to a second wrench.

BRIEF SUMMARY OF THE INVENTION

An embodiment of the disclosure meets the needs presented above by generally comprising a sleeve that has a slot extending through an outer wall of the sleeve such that a wrench is insertable into the sleeve. The slot accommodates a head of the wrench to increase leverage a user can apply to the wrench. The slot has an entry portion curving into a straightened portion. A channel is integrated into an interior of the sleeve thereby facilitating the channel to insertably receive the head of the wrench. Furthermore, the channel inhibits the head from tipping in the sleeve thereby inhibiting the wrench from tipping in the sleeve when the user is employing the wrench to loosen or tighten a fastener.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
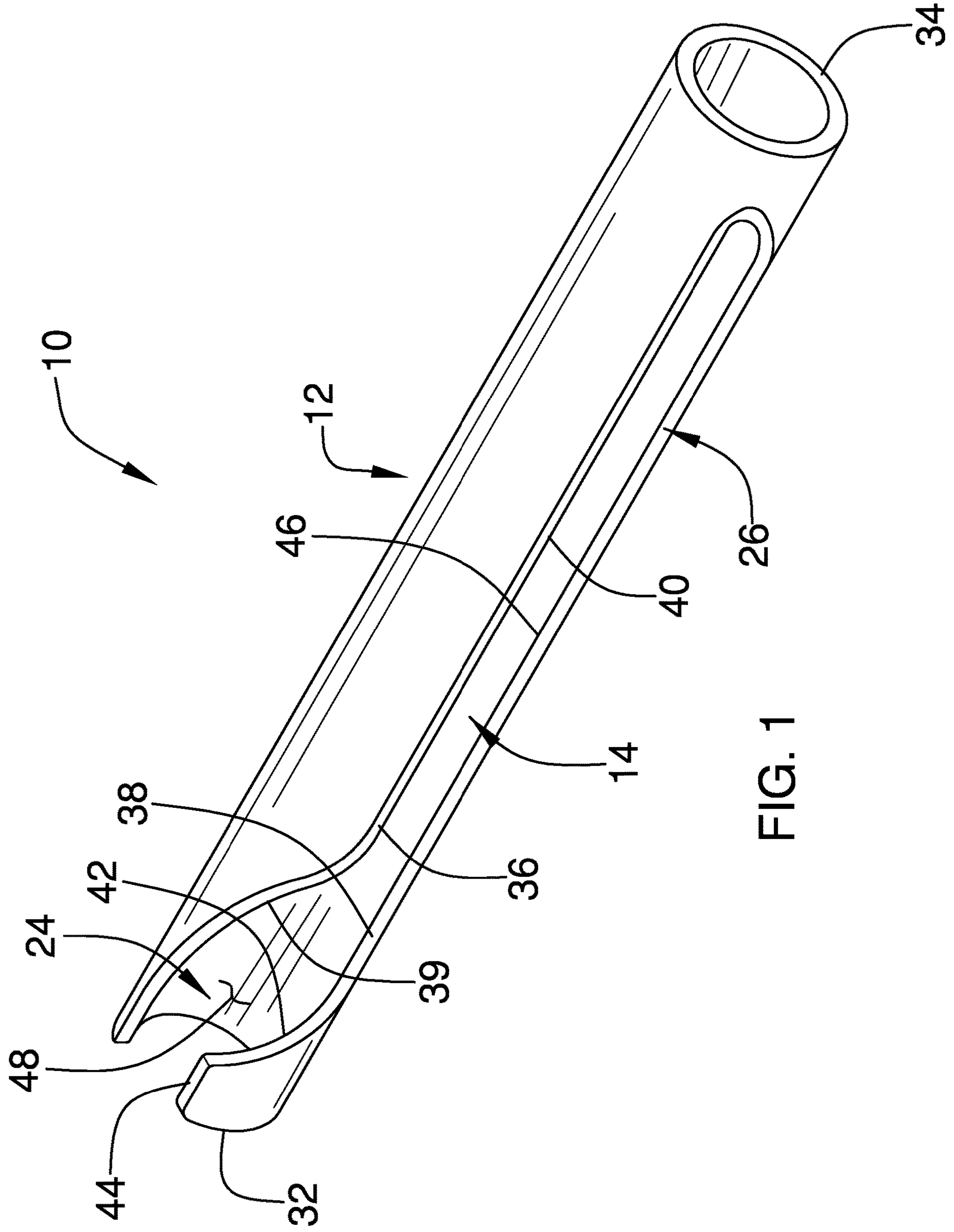
FIG. 1 is a perspective view of a wrench extension assembly according to an embodiment of the disclosure.
Figure 2:
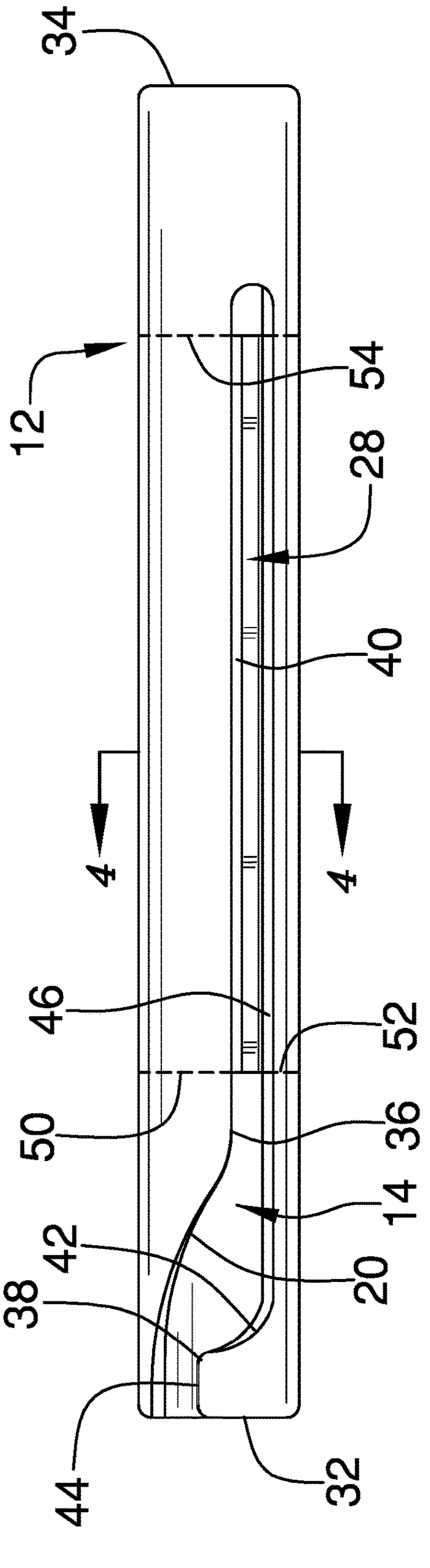
FIG. 2 is a right side view of an embodiment of the disclosure.
Figure 4:
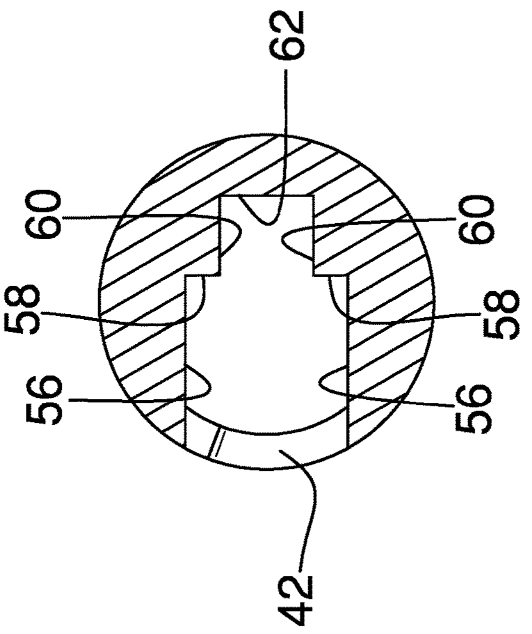
FIG. 4 is a cross sectional view taken along line 4-4 of FIG. 2 of an embodiment of the disclosure.
Figure 3:
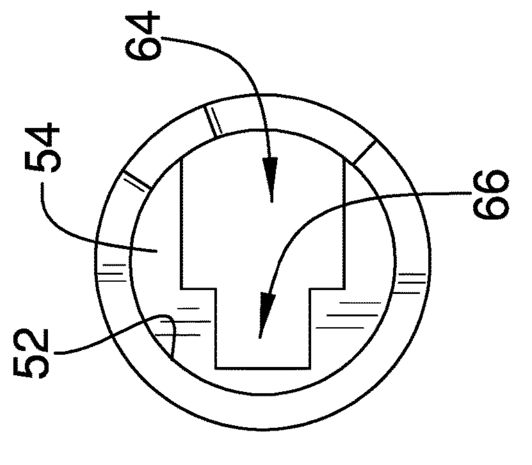
FIG. 3 is a front view of an embodiment of the disclosure.
Figure 5:
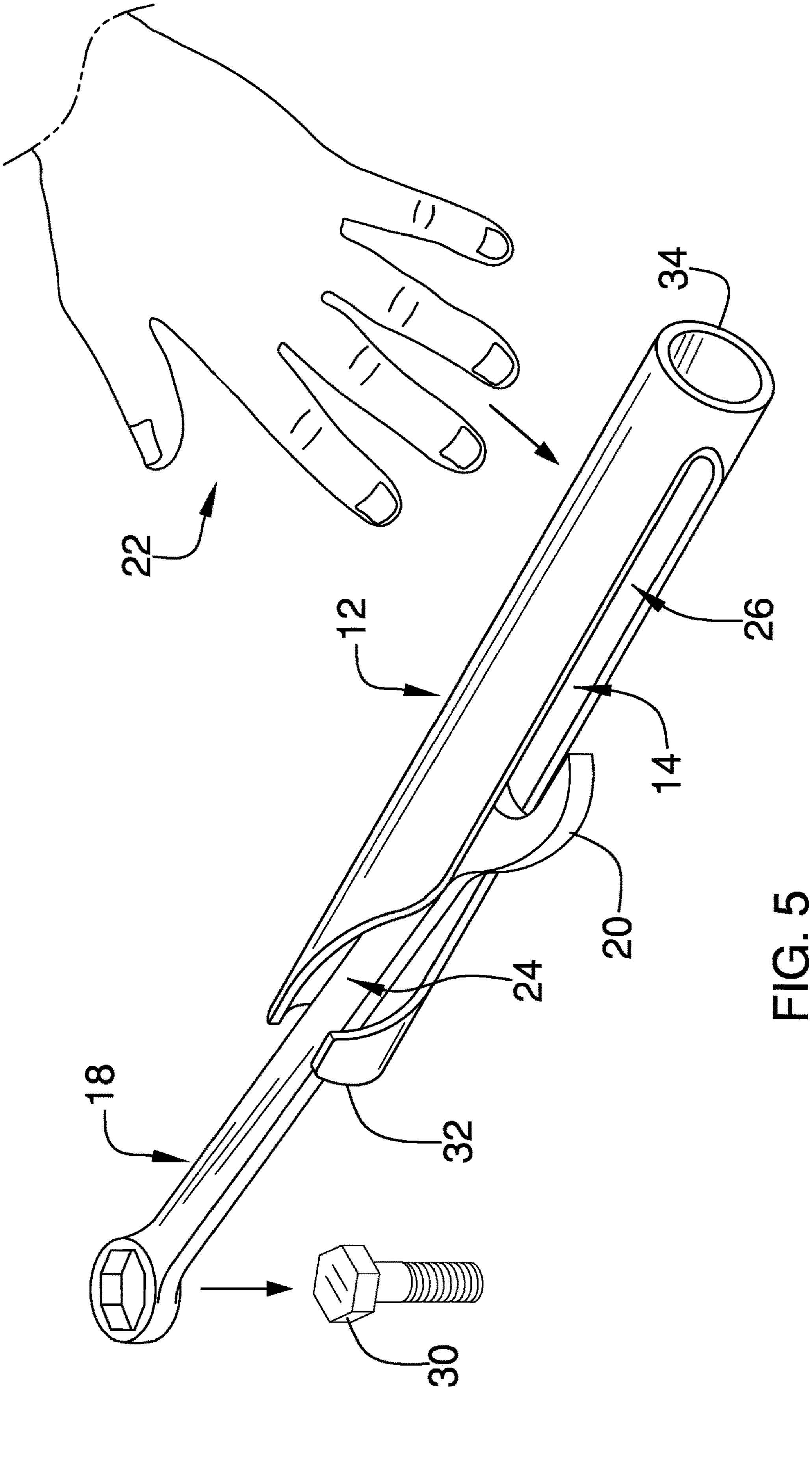
FIG. 5 is a perspective in-use view of an embodiment of the disclosure.

With reference now to the drawings, and in particular to FIGS. 1 through 5 thereof, a new extension device embodying the principles and concepts of an embodiment of the disclosure and generally designated by the reference numeral 10 will be described.

As best illustrated in FIGS. 1 through 5, the wrench extension assembly 10 generally comprises a sleeve 12 that has a slot 14 extending through an outer wall 16 of the sleeve 12 such that a wrench 18 is insertable into the sleeve 12 having the slot 14 accommodating a head 20 of the wrench 18. In this way the sleeve 12 can be gripped to increase leverage a user 22 can apply to the wrench 18. The slot 14 extends along a substantial length of the sleeve 12 and the slot 14 has an entry portion 24 curving into a straightened portion 26. Furthermore, the entry portion 24 extends along a longitudinal axis that is offset from a longitudinal axis of the straightened portion 26 thereby inhibiting the wrench 18 from inadvertently sliding out of the sleeve 12. The sleeve 12 has a channel 28 that is integrated into an interior of the sleeve 12 thereby facilitating the channel 28 to insertably receive the head 20 of the wrench 18. In this way the channel 28 inhibits the head 20 from tipping in the sleeve 12 when the user 22 is employing the wrench 18 to loosen or tighten a fastener 30.

The sleeve 12 has a first end 32 and a second end 34 having the outer wall 16 extending between the first end 32 and the second end 34; the slot 14 extends through the outer wall 16. The entry portion 24 of the slot 14 extends from the first end 32 toward the second end 34 and the straightened portion 26 of the slot 14 extends from the entry portion 24 toward the second end 34. The slot 14 has an upper bounding edge 36 and a lower bounding edge 38. The upper bounding edge 36 has a curve 39 between the first end 32 and a straightened portion 40 of the upper bounding edge 36. The straightened portion 40 of the upper bounding edge 36 extends along a straight line.

The lower bounding edge 38 has a curve 42 located between a first portion 44 and a second portion 46 of the lower bounding edge 38. The first portion 44 intersects the first end 32 of the sleeve 12 having the first portion 44 extending along an axis that is oriented parallel with the second portion 46 of the lower bounding edge 38. Furthermore, the second portion 46 is aligned with and is oriented parallel with the straightened portion 40 of the upper bounding edge 36. The curve 42 in the lower bounding edge 38 curves in an opposite direction with respect to the curve 39 in the upper bounding edge 36. The entry portion 24 of the slot 14 is defined between the first portion 44 and the upper bounding edge 36. The straightened portion 26 of the slot 14 is defined between the straightened portion 40 of the upper bounding edge 36 and the second portion 46 of the lower bounding edge 38. Additionally, the slot 14 is rounded at an intersection between the straightened portion 40 of the upper bounding edge 36 and the second portion 46 of the lower bounding edge 38.

The sleeve 12 has an interior surface 48 and the interior surface 48 has a central portion 50 extending between a first end portion 52 and a second end portion 54. The first end portion 52 is associated with the first end 32 of the sleeve 12. The second end portion 54 is associated with the second end 34 of the sleeve 12. Each of the first end portion 52 and the second end portion 54 are continuously curved such that each of the first end portion 52 and the second end portion 54 define a cylindrical shape.

The central portion 50 has a pair of first surfaces 56 that are spaced apart from each other and which lie on a parallel plane with respect to each other. The central portion 50 has a pair of second surfaces 58 perpendicularly oriented with a respective one of the first surfaces 56 having the second surfaces 58 extending toward each other. The central portion 50 has a pair of third surfaces 60 each perpendicularly oriented with a respective one of the second surfaces 58 having each of the third surfaces 60 being oriented parallel with the first surfaces 56. The central portion 50 has a fourth surface 62 extending between and being perpendicularly oriented with the third surfaces 60.

The first surfaces 56, the second surfaces 58, the third surfaces 60 and the fourth surface 62 define the channel 28. The first surfaces 56 define a primary section 64 of the channel 28 and the third surfaces 60 define a secondary section 66 of the channel 28. The secondary section 66 has a width that is less than a width of the primary section 64. The primary section 64 receives the head 20 of a larger sized wrench 18 and the secondary section 66 receives the head 20 of a smaller sized wrench 18. Furthermore, the wrench 18 may be a box end wrench, an open end wrench or a combination wrench.

In use, a respective head 20 of the wrench 18 is inserted into the entry portion 24 of the slot 14 and the wrench 18 is twisted to urge the wrench 18 through the transition between the entry portion 24 of the slot 14 and the straightened portion 26 of the slot 14. In this way the respective head 20 is positioned in either the primary section 64 of the channel 28 or the secondary section 66 of the channel 28, depending on the width of the respective head 20. Thus, the wrench 18 is restrained in the sleeve 12 thereby facilitating the user 22 to grip the sleeve 12 to either tighten or loosen a fastener 30 with the wrench 18. Furthermore, the sleeve 12 increases the total length of the wrench 18 thereby increasing the amount of leverage the user 22 can apply with the wrench 18. In this way a physically limited user 22 can more easily break a tight fastener 30 loose as compared to using the wrench 18 alone.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wrench extension assembly for extending the length of a wrench thereby increasing leverage for a user, said assembly comprising:

a sleeve having a slot extending through an outer wall of said sleeve such that a wrench is insertable into said sleeve having said slot accommodating a head of the wrench thereby facilitating said sleeve to be gripped wherein said sleeve is configured to increase leverage a user can apply to the wrench, said slot extending along a substantial length of said sleeve, said slot having an entry portion curving into a straightened portion such that said entry portion extends along a longitudinal axis being offset from a longitudinal axis of said straightened portion thereby inhibiting the wrench from inadvertently sliding out of said sleeve, said sleeve having a channel being integrated into an interior of said sleeve thereby facilitating said channel to insertably receive the head of the wrench such that said channel inhibits the head from tipping in said sleeve wherein said channel is configured to inhibit the wrench from tipping in said sleeve when the user is employing the wrench to loosen or tighten a fastener.

2. The assembly according to claim 1, wherein said sleeve has a first end and a second end having said outer wall extending between said first end and said second end, said slot extending through said outer wall, said entry portion of said slot extending from said first end toward said second end, said straightened portion of said slot extending from said entry portion toward said second end.

3. The assembly according to claim 2, wherein:

said slot has an upper bounding edge and a lower bounding edge;

said upper bounding edge curves between said first end and a straightened portion of said upper bounding edge;

said straightened portion of said upper bounding edge extends along a straight line;

said lower bounding edge has a curve located between a first portion and a second portion of said lower bounding edge, said first portion intersecting said first end of said sleeve having said first portion extending along an axis being oriented parallel with said second portion of said lower bounding edge;

said second portion is aligned with and is oriented parallel with said straightened portion of said upper bounding edge;

said curve in said lower bounding edge curves in an opposite direction with respect to said curve in said upper bounding edge;

said entry portion is defined between said first portion and said upper bounding edge;

said straightened portion of said slot is defined between said straightened portion of said upper bounding edge and said second portion of said lower bounding edge; and said slot is rounded at an intersection between said straightened portion of said upper bounding edge and said second portion of said lower bounding edge.

4. The assembly according to claim 3, wherein said sleeve has an interior surface, said interior surface having a central portion extending between a first end portion and a second end portion, said first end portion being associated with said first end of said sleeve, said second end portion being associated with said second end of said sleeve.

5. The assembly according to claim 4, wherein;

said central portion has a pair of first surfaces being spaced apart from each other and lying on a parallel plane with respect to each other;

said central portion has a pair of second surfaces each being perpendicularly oriented with a respective one of said first surfaces having said second surfaces extending toward each other;

said central portion has a pair of third surfaces each being perpendicularly oriented with a respective one of said second surfaces having each of said third surfaces being oriented parallel with said first surfaces; and said central portion has a fourth surface extending between and being perpendicularly oriented with said third surfaces.

6. The assembly according to claim 1, wherein:

said sleeve has an interior surface, said interior surface having a central portion, said central portion having a pair of first surfaces and a pair of second surfaces and a pair of third surfaces and a fourth surface such that said first surfaces and said second surfaces and said third surfaces and said fourth surface defines said channel;

said first surfaces define a primary section of said channel; and said third surfaces define a secondary section of said channel having a width being less than a width of said primary section.

7. The assembly according to claim 6, wherein:

said primary section receives the head of a large sized wrench; and said secondary section receives the head of a small sized wrench.

8. A wrench extension assembly for extending the length of a wrench thereby increasing leverage for a user, said assembly comprising:

a sleeve having a slot extending through an outer wall of said sleeve such that a wrench is insertable into said sleeve having said slot accommodating a head of the wrench thereby facilitating said sleeve to be gripped wherein said sleeve is configured to increase leverage a user can apply to the wrench, said slot extending along a substantial length of said sleeve, said slot having an entry portion curving into a straightened portion such that said entry portion extends along a longitudinal axis being offset from a longitudinal axis of said straightened portion thereby inhibiting the wrench from inadvertently sliding out of said sleeve, said sleeve having a channel being integrated into an interior of said sleeve thereby facilitating said channel to insertably receive the head of the wrench such that said channel inhibits the head from tipping in said sleeve wherein said channel is configured to inhibit the wrench from tipping in said sleeve when the user is employing the wrench to loosen or tighten a fastener, said sleeve having a first end and a second end having said outer wall extending between said first end and said second end, said slot extending through said outer wall, said entry portion of said slot extending from said first end toward said second end, said straightened portion of said slot extending from said entry portion toward said second end, said slot having an upper bounding edge and a lower bounding edge, said upper bounding edge curving between said first end and a straightened portion of said upper bounding edge, said straightened portion of said upper bounding edge extending along a straight line, said lower bounding edge having a curve located between a first portion and a second portion of said lower bounding edge, said first portion intersecting said first end of said sleeve having said first portion extending along an axis being oriented parallel with said second portion of said lower bounding edge, said second portion being aligned with and being oriented parallel with said straightened portion of said upper bounding edge, said curve in said lower bounding edge curving in an opposite direction with respect to said curve in said upper bounding edge, said entry portion being defined between said first portion and said upper bounding edge, said straightened portion of said slot being defined between said straightened portion of said upper bounding edge and said second portion of said lower bounding edge, said slot being rounded at an intersection between said straightened portion of said upper bounding edge and said second portion of said lower bounding edge, said sleeve having an interior surface, said interior surface having a central portion extending between a first end portion and a second end portion, said first end portion being associated with said first end of said sleeve, said second end portion being associated with said second end of said sleeve, said central portion having a pair of first surfaces being spaced apart from each other and lying on a parallel plane with respect to each other, said central portion having a pair of second surfaces each being perpendicularly oriented with a respective one of said first surfaces having said second surfaces extending toward each other, said central portion having a pair of third surfaces each being perpendicularly oriented with a respective one of said second surfaces having each of said third surfaces being oriented parallel with said first surfaces, said central portion having a fourth surface extending between and being perpendicularly oriented with said third surfaces such that said first surfaces and said second surfaces and said third surfaces and said fourth surface defines said channel, said first surfaces defining a primary section of said channel, said third surfaces defining a secondary section of said channel having a width being less than a width of said primary section, said primary section receiving the head of a large sized wrench, said secondary section receiving the head of a small sized wrench.

9. A wrench extension system for extending the length of a wrench thereby increasing leverage for a user, said system comprising:

a wrench having a pair of heads; and a sleeve having a slot extending through an outer wall of said sleeve such that said wrench is insertable into said sleeve having said slot accommodating a respective one of said heads of said wrench thereby facilitating said sleeve to be gripped wherein said sleeve is configured to increase leverage a user can apply to said wrench, said slot extending along a substantial length of said sleeve, said slot having an entry portion curving into a straightened portion such that said entry portion extends along a longitudinal axis being offset from a longitudinal axis of said straightened portion thereby inhibiting said wrench from inadvertently sliding out of said sleeve, said sleeve having a channel being integrated into an interior of said sleeve thereby facilitating said channel to insertably receive said respective head of said wrench such that said channel inhibits said respective head from tipping in said sleeve wherein said channel is configured to inhibit said wrench from tipping in said sleeve when the user is employing said wrench to loosen or tighten a fastener, said sleeve having a first end and a second end having said outer wall extending between said first end and said second end, said slot extending through said outer wall, said entry portion of said slot extending from said first end toward said second end, said straightened portion of said slot extending from said entry portion toward said second end, said slot having an upper bounding edge and a lower bounding edge, said upper bounding edge curving between said first end and a straightened portion of said upper bounding edge, said straightened portion of said upper bounding edge extending along a straight line, said lower bounding edge having a curve located between a first portion and a second portion of said lower bounding edge, said first portion intersecting said first end of said sleeve having said first portion extending along an axis being oriented parallel with said second portion of said lower bounding edge, said second portion being aligned with and being oriented parallel with said straightened portion of said upper bounding edge, said curve in said lower bounding edge curving in an opposite direction with respect to said curve in said upper bounding edge, said entry portion being defined between said first portion and said upper bounding edge, said straightened portion of said slot being defined between said straightened portion of said upper bounding edge and said second portion of said lower bounding edge, said slot being rounded at an intersection between said straightened portion of said upper bounding edge and said second portion of said lower bounding edge, said sleeve having an interior surface, said interior surface having a central portion extending between a first end portion and a second end portion, said first end portion being associated with said first end of said sleeve, said second end portion being associated with said second end of said sleeve, said central portion having a pair of first surfaces being spaced apart from each other and lying on a parallel plane with respect to each other, said central portion having a pair of second surfaces each being perpendicularly oriented with a respective one of said first surfaces having said second surfaces extending toward each other, said central portion having a pair of third surfaces each being perpendicularly oriented with a respective one of said second surfaces having each of said third surfaces being oriented parallel with said first surfaces, said central portion having a fourth surface extending between and being perpendicularly oriented with said third surfaces such that said first surfaces and said second surfaces and said third surfaces and said fourth surface defines said channel, said first surfaces defining a primary section of said channel, said third surfaces defining a secondary section of said channel having a width being less than a width of said primary section, said primary section receiving said respective head of a large sized wrench, said secondary section receiving said respective head of a small sized wrench.

* * * * *